United States Patent

Cooper

[15] 3,686,570

[45] Aug. 22, 1972

[54] LINEAR MOTION METER DEVICE

[72] Inventor: Jack A. Cooper, Grand Rapids, Mich.

[73] Assignee: Lear Siegler, Inc.

[22] Filed: Jan. 23, 1970

[21] Appl. No.: 5,182

[52] U.S. Cl. .................................. 324/132, 324/99 R
[51] Int. Cl. ......................... G01r 15/10, G01r 17/06
[58] Field of Search .......... 324/132, 100, 76 R, 99 R

[56] References Cited

UNITED STATES PATENTS

| | | | |
|---|---|---|---|
| 3,323,058 | 5/1967 | Anthon | 324/132 |
| 3,296,529 | 1/1967 | Sundstrom | 324/132 |

FOREIGN PATENTS OR APPLICATIONS

| | | | |
|---|---|---|---|
| 30,758 | 11/1907 | Austria | 324/132 |
| 513,224 | 11/1930 | Germany | 324/132 |
| 1,102,273 | 3/1961 | Germany | 324/132 |

*Primary Examiner*—Rudolph V. Rolinec
*Assistant Examiner*—Ernest F. Karlsen
*Attorney*—Wilfred O. Schmidt

[57] ABSTRACT

A meter having a flat linear readout scale and utilizing a rotating input shaft, the shaft being driven by a torque motor and connecting to a two-arm linkage which converts the rotation into straight-line motion. The longer of the two arms in this linkage is divided into two segments, and it is found that for maximum linearity output the relative lengths of the arms should be, for the first arm, the first segment of the second arm, and the second segment of the second arm, in the ratio of about 1.31:1.58:2.06, respectively. Because there is still a small amount of nonlinearity involved in such a linkage where even this ratio is used, a shaped follow-up potentiometer is connected to the drive shaft of the motor so as to develop a correcting signal in accordance with the angular position of the shaft, which signal is fed back to the motor.

4 Claims, 7 Drawing Figures

INVENTOR.
JACK A. COOPER
BY
ATTORNEY

INVENTOR.
JACK A. COOPER
BY
ATTORNEY

LINEAR MOTION METER DEVICE

BACKGROUND OF THE INVENTION

In many meters, the input representative of the values to be read out is via a rotational shaft. Such an input requires either a curved readout scale or, if a flat scale is desired, some form of converter to convert the rotational movement to a straight-line motion. The difficulty with a curved scale is parallax and collective light reflection from its curved cover window, thus making the scale inconvenient to read. Although flat scales are generally preferred as a matter of human nature, they do not predominate in number, since the required converters to straight-line motion have a number of known disadvantages, an important one of which is the fact that because of the mass of the linkages involved, the conventional D'Arsonval meter movement cannot be utilized, since such a meter movement cannot produce sufficient torque to overcome the inertia of the linkages. Also, the nonlinearity present in the linkages has required, in conventional meters, a third link in addition to the two primary or essential links, the third link being driven from the drive shaft and intended to correct for nonlinearity. An example of such a linkage utilized to convert rotary motion to straight-line motion is disclosed in U.S. Pat. No. 3,312,980.

SUMMARY OF THE INVENTION

This invention relates to a flat scale meter utilizing a linkage to convert from limited angular rotation to straight-line motion, the linkage comprising only two arms. Specifically, it has been discovered that by a particular choice of linkage dimensions and by using a new form of drive means for the linkage, it is possible to construct a converting linkage which eliminates a third arm and which connects the shorter arm of the two linkages directly to the drive shaft. Thus, a linear meter has been developed for measuring values on a flat linear scale wherein the input is limited angular rotation. The meter comprises a pointer, means for sensing the input values and expressing the same as a first signal, means for amplifying the signal, a torque motor driven by the signal and having a drive shaft, means connected to the shaft for converting angular rotation of the same into straight-line motion of the pointer, and means for compensating for any nonlinearity present in said converting means, said compensating means including means physically connected to the shaft for delivering an input signal to the amplifying means to alter the signal received from the sensing means. Preferably, the delivering means just referred to includes a follow-up potentiometer which is shaped to provide particular outputs at particular shaft positions.

Accordingly, it is an object of the invention to provide a linear-movement meter wherein values inputted to the meter as limited angular rotation are read out by a pointer which moves in a straight line along a flat linear scale.

It is an additional object of the invention to provide a meter of the above character wherein a mechanical linkage is provided for converting the limited angular rotation to straight-line motion.

It is a further object of the invention to provide a meter of the above character wherein only two arms are utilized in the linkage.

It is still another object of the invention to provide a meter of the above character wherein the short arm of the linkage is directly connected to the input shaft.

It is a related object of the invention to provide a meter of the above character which is simplified in construction and which is inexpensive to produce.

Other objects and advantages will become apparent upon reference to the following drawings and detailed description.

DESCRIPTION OF THE PREFERRED EMBODIMENT

Figure 1:
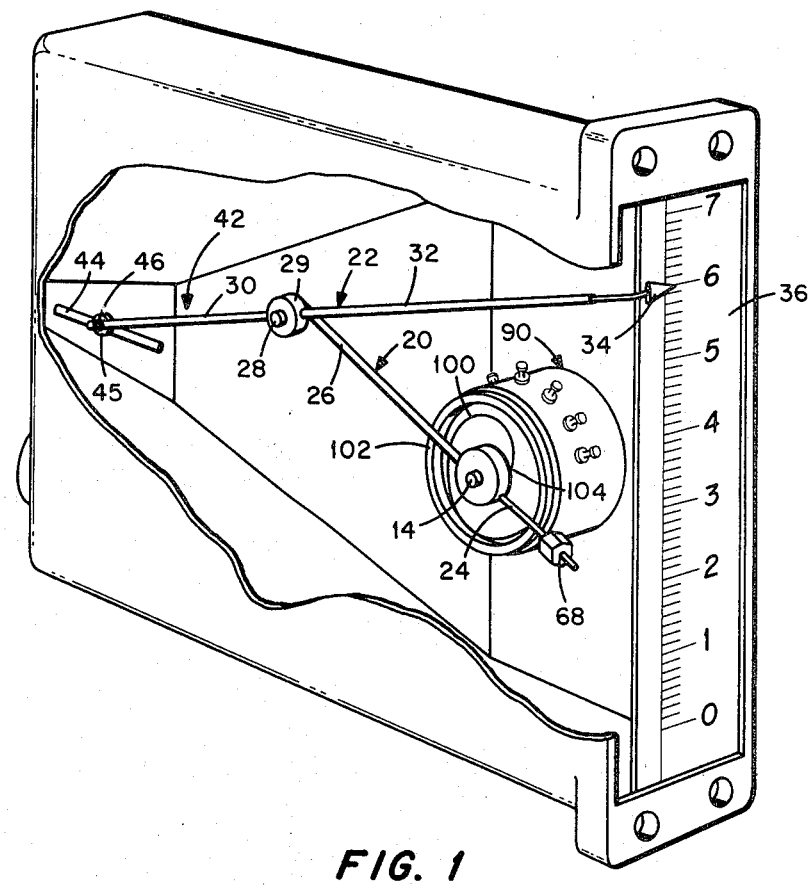
FIG. 1 is a perspective view partially broken away, of a meter constructed in accordance with the invention.

This invention relates to a meter for measuring practically any given desired parameter, the latter being sensed by any conventional means 10 which provides an output signal representative of the measured values, such signal being delivered to the meter on an input conductor 12. As in most meters, the input signal is ultimately transformed to a limited angular rotation appearing on a drive shaft 14, and it is the manner of producing this limited angular rotation and converting it to straight-line motion which is of particular importance in the meter of this invention.

In accordance with the invention, a linkage is used which consists of a first arm 20 (FIG. 1) and a second arm 22, the first arm 20 being fixed near one of its ends to the shaft 14 of a torque motor. The other end 26 of the arm 20 is pivotally attached by means of a pivot pin 28 to a bearing member 29 secured to the second arm 22 which, in effect, permanently divides that second arm into a first segment 30 and a second segment 32, each having lengths bearing a fixed ratio. The end of the second segment 32 remote from the pin 28 terminates in an indicator such as pointer 34, which is to move in a linear manner up and down a vertical scale 36. To take up the excursion in the linkage system as the shaft 14 rotates, the end of segment 30 which is remote from the pin 28 is confined to move in a direction which is perpendicular to the plane of the scale 36 and to the motion of the pointer 34. The confining means includes a plate 42 forming the mounting structure for the entire meter, the plate having a slot 44 therein which slidably seats a bushing 45, to which linkage segment 30 is attached, as by a pin 46 extending through the bushing.

Figure 2:
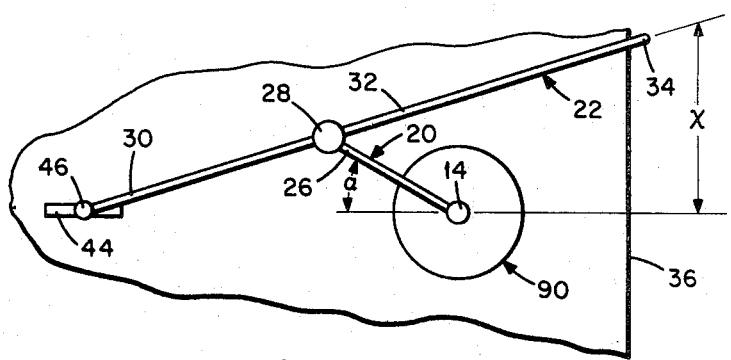
FIG. 2 and FIG. 3 are fragmentary, partially schematic, elevational view of the linkage utilized in the meter.
Figure 3:
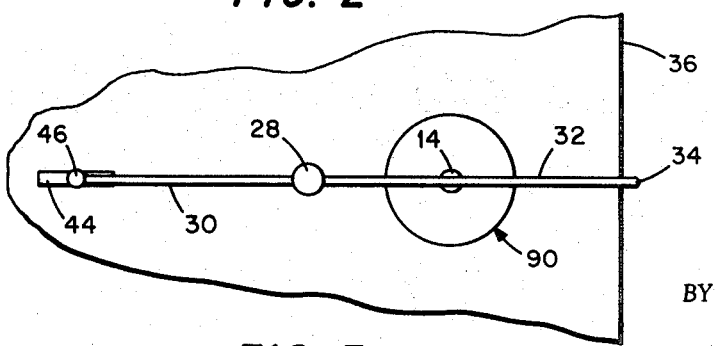
Figure 7:
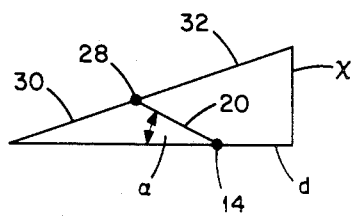
FIG. 7 is a schematic view of the linkage illustrating the trigonometric relationship therein.

To make this arrangement produce a substantially straight vertical line motion for the pointer 34, the relative lengths of the first arm 20, the first segment 30, and the second segment 32 should be in the approximate ratio of 1.30761:1.58154:2.05761. By the use of trigonometry (FIG. 7), it is possible to express the vertical distance $x$ moved by the pointer 34 from the position shown in FIG. 2 as a function of the angle $\alpha$, utilizing the triangular relationships depicted in FIG. 7. That expression can be written as follows:

$$x = (1+c/b) a \sin \alpha \qquad (1)$$

where $a$ = length of arm 20
$b$ = length of segment 30
$c$ = length of segment 32

Similarly, the distance $d$ (FIG. 7) can be expressed as a similar function, as follows:

$$d = c \sqrt{1 - (a^2/b^2) \sin^2 \alpha} - a \cos \alpha \qquad (2)$$

Figure 5:
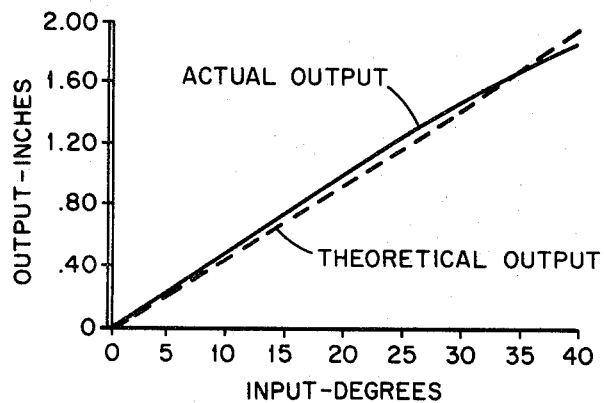
FIG. 5 is a graph illustrating the limited nonlinearity present in the linkage utilized in the device without benefit of the compensating means.

The value for $d$ was arbitrarily selected to be 0.75 inch. The perfect desired relationship between $x$ and $\alpha$ is shown in the straight dashed line of FIG. 5. From this, the values of $a$, $b$ and $c$ were determined by a "cut and try" method utilizing the best fit obtainable to the straight line shown in FIG. 5, the best fit being obtained by the least-squared error method. The result of the best fit is shown as the solid line in FIG. 5, which does depart slightly from perfect linearity as represented by the dashed line at all points except $\alpha = 0°$ and $\alpha$ approximately = 31.5°. The correction of the motion of pointer 34 is accomplished by means hereinafter discussed.

Figure 4:
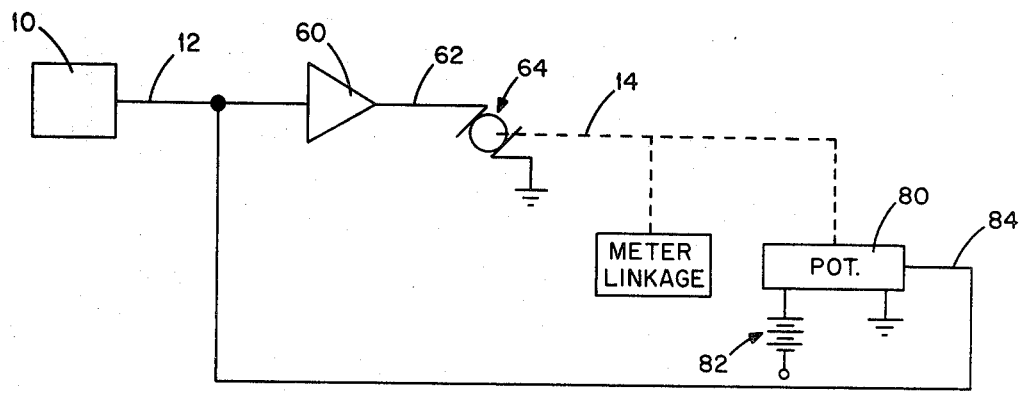
FIG. 4 is a schematic block diagram of the circuit controlling the meter.

The drive and control of the meter movement is as follows (FIG. 4): the output signal from sensor 10 is fed to an operational amplifier 60, from whence a drive signal on conductor 62 is supplied to a means for rotating the drive shaft 14. Because of the mass of the converting linkage utilized and of the inertia developed therein, it is necessary to supply torque to the drive shaft 14 in response to the signal on conductor 62. To that end, a torque motor 64 is utilized, the motor itself being conventional. For example, a brushless DC torquer can be utilized. In any event, the output shaft of the torque motor is the drive shaft 14, which shaft is fixedly connected to the lower end 24 of the arm 20. As shown in FIG. 1, the end 24 can extend out beyond the drive shaft of the torque motor to a point where an adjustable weight 68 is attached, but such extension is not absolutely necessary. In any event, the effective length of arm 20 remains the same during the operation of the meter.

To correct the limited nonlinearity present in the particular ratio of arm lengths utilized in the linkage, a follow-up potentiometer 80 is attached to the drive shaft 14 of the motor, so that the rotation of the drive shaft 14 alters the setting of the potentiometer. A source represented as a battery 82 supplies an input signal to the potentiometer, the output signal on a conductor 84 from the potentiometer being dependent upon the setting of the potentiometer as determined by the position of the shaft 14. The signal on conductor 84 in turn is then fed back to the input to amplifier 60, thus closing a feedback loop which modifies the output of the amplifier in accordance with the relative positioning of the motor shaft. The potentiometer is shaped in accordance with the linkage operation (FIG. 5) to produce an output function 84 which exactly counters the nonlinearity present in the output of the linkage. Although not strictly necessary, the potentiometer can be integrally mounted (as shown in FIG. 1) with the torque motor 64, so as to share the same housing 90 and to share the same drive shaft.

Figure 6:
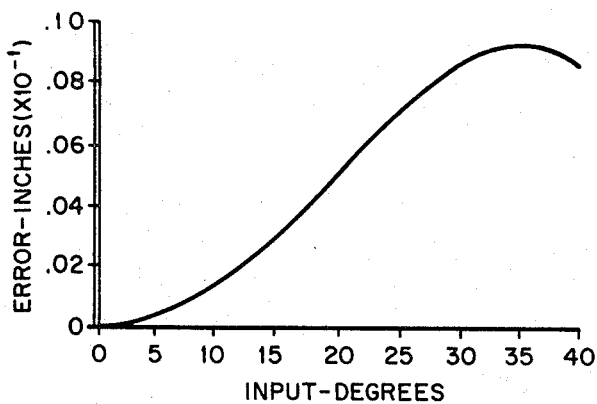
FIG. 6 is a graph of the horizontal displacement between the scale and the pointer as the pointer moves vertically even when the compensating means is incorporated into the system.

Although the use of the potentiometer 80 corrects nonlinearity incurred by pointer 34 in its vertical motion in response to a given angular input by shaft 14, the linkage is such that there still is a slight departure in the motion of the pointer 34 from the vertical plane paralleling the scale 36, incurred as the angle alpha increases. That departure from the vertical plane is depicted in FIG. 6, but as is readily apparent, the maximum departure is only one one-hundredth of an inch. Such a departure is hardly noticeable to one utilizing the meter and has substantially no effect on the readability of the flat scale 36.

To return the pointer 34 to the zero value of the scale 36, or to a point off-scale, a hair spring 100 (FIG. 1) is mounted at one end 102 to the housing 90, and at its other end 104 to the shaft 14. Thus, when the input to the meter is zero, the spring 100 serves to rotate the shaft 14 back so that the pointer moves to the desired position.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention to which an exclusive property or privilege is claimed are defined as follows:

1. A meter movement for indicating values on a straight planar scale, said meter comprising: a movable indicator element; means for providing an electrical input signal representative of the values to be indicated; means for amplifying said signal; a motor driven by the amplified signal and having an output drive shaft; means connected between said shaft and said indicator element for converting angular rotation of the shaft into substantially flat, straight-line motion of said indicator; said conversion means including a first arm fixed at one end portion thereof to said output drive shaft; a second arm having one end thereof coupled to said movable indicator element; means mounting the other end portion of said second arm for reciprocable movement in a direction generally perpendicular to the direction of movement of said indicator element; and means pivotably securing another end portion of said first arm to a central portion of said second arm; said conversion means resulting in a small degree of nonlinearity between said straight-line motion and said angular rotation; and means for compensating for said nonlinearity present in said converting means, said compensating means including means coupled to said output shaft to sense the angular position thereof; preprogrammed means coupled to said sensing means for generating a compensation signal which is a function of the angular position of said output shaft and shaped to compensate for said nonlinearity, and means for applying said compensation signal to said input signal; whereby said indicator element is moved linearly with respect to the angular rotation of said output drive shaft despite any such nonlinearity which may be present in said conversion means.

2. The linear meter as defined in claim 1 wherein said preprogrammed means includes a follow-up potentiometer, said potentiometer outputting said compensation signal to said amplifying means as a function of the rotation of said shaft.

3. The linear meter as defined in claim 1 wherein said motor and said compensating means are mounted directly adjacent one another and have a common shaft.

4. The linear meter as defined in claim 1, further including means for returning said indicator element toward a predetermined value on said scale in the absence of said input signal.

* * * * *